(12) United States Patent
Thorson et al.

(10) Patent No.: US 8,591,125 B1
(45) Date of Patent: Nov. 26, 2013

(54) FIBER OPTIC DIE CIRCUIT ASSEMBLY AND METHOD OF MAKING

(75) Inventors: Kevin J. Thorson, Eagan, MN (US);
Roger J. Karnopp, Eagan, MN (US);
Gregory M. Drexler, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 294 days.

(21) Appl. No.: 12/614,663

(22) Filed: Nov. 9, 2009

(51) Int. Cl.
*G02B 6/36* (2006.01)

(52) U.S. Cl.
USPC .................................. 385/88; 385/89; 385/92

(58) Field of Classification Search
USPC .................................................... 385/88–92
See application file for complete search history.

(56) References Cited

U.S. PATENT DOCUMENTS

| | | | |
|---|---|---|---|
| 6,056,488 A | 5/2000 | Depoy | |
| 6,322,257 B1 | 11/2001 | Kryzak | |
| 6,356,686 B1 * | 3/2002 | Kuczynski | 385/39 |
| 6,634,802 B2 * | 10/2003 | Brezina et al. | 385/88 |
| 6,685,363 B2 * | 2/2004 | Kryzak | 385/89 |
| 6,736,553 B1 * | 5/2004 | Stiehl et al. | 385/89 |
| 6,815,729 B1 * | 11/2004 | Brophy et al. | 257/98 |
| 6,892,449 B1 | 5/2005 | Brophy et al. | |
| 7,068,892 B1 * | 6/2006 | Lu et al. | 385/52 |
| 7,208,725 B2 * | 4/2007 | Sherrer et al. | 250/239 |
| 7,217,043 B2 | 5/2007 | Schunk | |
| 7,284,916 B2 | 10/2007 | Sasser et al. | |
| 7,350,985 B2 * | 4/2008 | Laughlin et al. | 385/89 |
| 2002/0031313 A1 * | 3/2002 | Williams | 385/92 |
| 2003/0053766 A1 | 3/2003 | Cheng et al. | |
| 2003/0201462 A1 | 10/2003 | Pommer et al. | |
| 2005/0175297 A1 * | 8/2005 | Mazotti et al. | 385/92 |

OTHER PUBLICATIONS

U.S. Appl. No. 12/467,406, filed May 18, 2009.
U.S. Appl. No. 12/549,893, filed Aug. 28, 2009.
U.S. Appl. No. 12/554,293, filed Sep. 4, 2009.

* cited by examiner

*Primary Examiner* — Hemang Sanghavi
(74) *Attorney, Agent, or Firm* — Hamre, Schumann, Mueller & Larson, P.C.

(57) ABSTRACT

A die circuit assembly and method are described that integrates a first fiber optic die and a second fiber optic die into one assembly containing alignment features allowing for the accurate aligning of the fiber optic die to a fiber optic connector. The die circuit assembly can be attached to a flexible circuit in a manner to ensure the planarity of the fiber optic die is kept normal to the fiber optic connector. A method is also described where a plurality of the die circuit assemblies are formed from a single assembly.

25 Claims, 5 Drawing Sheets

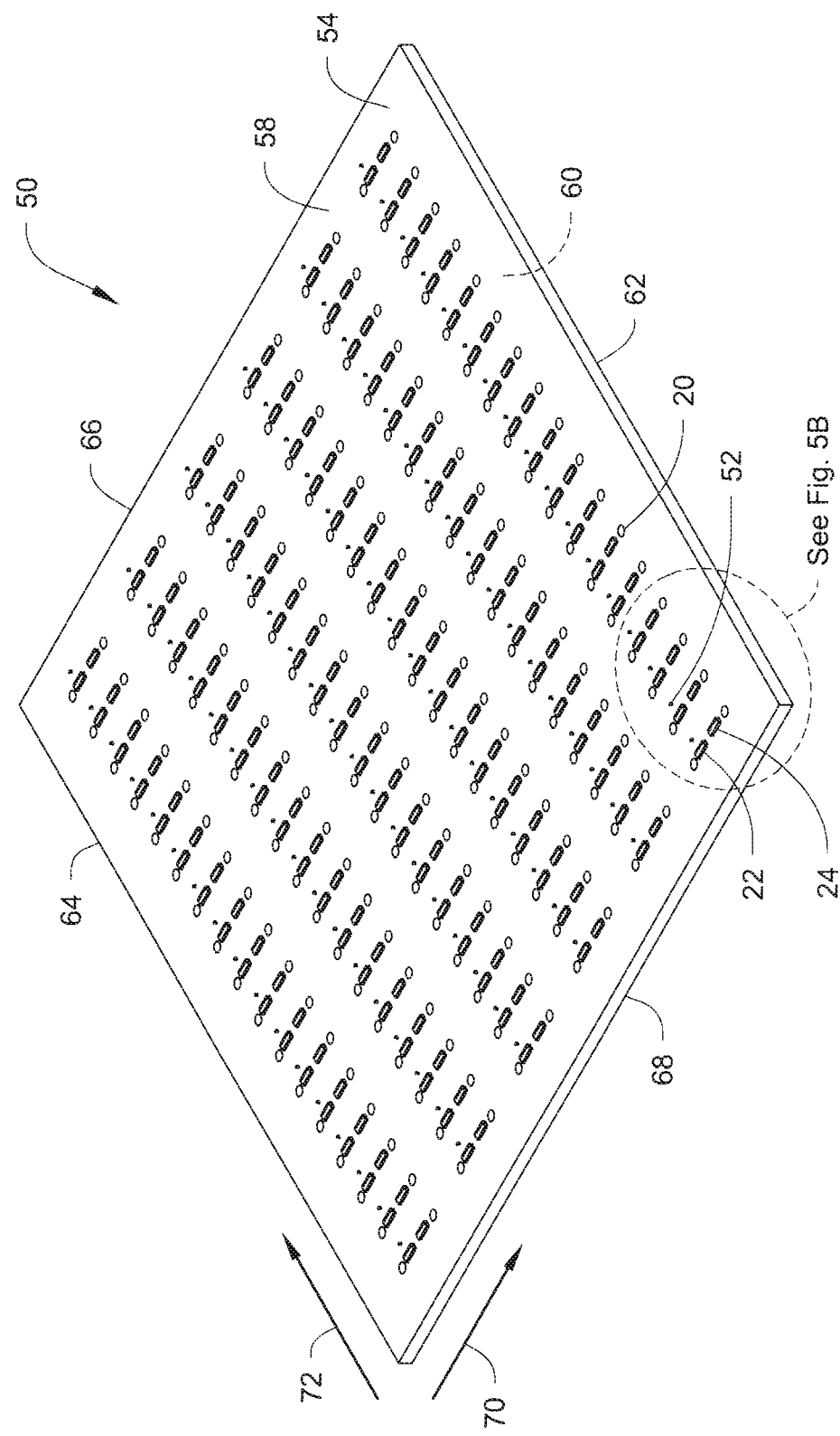

FIBER OPTIC DIE CIRCUIT ASSEMBLY AND METHOD OF MAKING

FIELD

This disclosure relates to a fiber optic die circuit assembly containing at least one optical transmitter die and at least one optical receiver die. The assembly contains alignment features to allow for accurate integration of the fiber optic die on the die circuit assembly and the accurate integration of the die circuit assembly to a flexible circuit.

BACKGROUND

Known optical interfaces are comprised of a fiber optic transmitter die and a receiver die mounted on separate circuit assemblies thereby requiring two fiber optic connectors and an area within an optical transceiver component sized to separately mount two assemblies. Additionally, alignment features of the circuit assemblies, for attachment to a flex circuit, are created subsequent to the attachment of the die. Because of the subsequent creation of alignment features, the likelihood of assemblies that are not properly aligned is high. Alignment errors render the assembly as unusable or require an expensive rework. The alignment feature process is excessively time consuming and also requires an inefficient set-up. In addition, the process requires the creation of one die assembly at a time.

SUMMARY

A die circuit assembly is described that integrates a first fiber optic die and a second fiber optic die with alignment features allowing for the placement of the die circuit assembly on a flexible circuit and the accurate aligning of the fiber optic die to a fiber optic connector, preferably a mechanical transfer (MT) connector. The die circuit assembly described herein is advantageous in that it can be mass produced, is inexpensive, and incorporates alignment features that effectively eliminate alignment errors that can render the die circuit unusable. In addition, due to the high tolerance of the alignment features, the die circuit assembly is able to be mounted on inexpensive, mass-produced flexible circuits.

The die circuit assembly is used in an optical transceiver component. The die circuit assembly receives and sends optical signals to the fiber optic connector. In addition, the die circuit assembly connects electrically to the flexible circuit and sends and receives signals to the optical transceiver component interfaces. Integration of the plurality of fiber optic die onto one die circuit assembly allows for the use of one fiber optic connector to transmit and receive signals. In addition, less area is required for the mounting of the assembly resulting in smaller optical transceiver components thereby resulting in a reduction in the host board footprint and the freeing of space on the host board for mounting other components.

In one example, the die circuit assembly integrates a first fiber optic die and a second fiber optic die into one assembly. The die circuit assembly is mass-produced where a plurality of die circuit assemblies are formed from a common substrate. The substrate has a plurality of fiducials marked on the surface and the fiber optic die are disposed, using fiducials as the alignment medium, on the surface of the substrate. Alignment holes are formed in relation to the location to the die and/or the fiducials and are preferably incorporated during the manufacturing process to ensure accurate alignment of the fiber optic die to the alignment holes. These alignment holes are made to align to off-the-shelf fiber optic connectors, preferably MT connectors. Each die circuit assembly is separated, preferably by cutting, from the substrate. A flexible circuit can be electrically connected to the fiber optic die by attachment of the die circuit assembly to a surface of the flexible circuit. Attachment of the die circuit assembly to the surface of the flexible circuit enables the planarity of the die to be kept normal to the fiber optic connector.

In one embodiment, the fiber optic die are surface mounted on the die circuit assembly. In another embodiment, the fiber optic die are recess mounted in the die circuit assembly. The die circuit assembly can have stand-offs that make contact with the surface of the flexible circuit when the die circuit assembly is attached to the surface of the flexible circuit.

DRAWINGS

FIG. 5A illustrates a multiple die circuit assembly with fiducials and die sets for use in forming individual die circuit assemblies.

DETAILED DESCRIPTION

A die circuit assembly is described that integrates a first fiber optic die and a second fiber optic die with alignment features allowing for the placement of the die circuit assembly on a flexible circuit and the accurate aligning of the fiber optic die to a fiber optic connector, most preferably a mechanical transfer (MT) connector. The die circuit assembly can be mass-produced on a common substrate using fiducials as an alignment feature.

Figure 1:
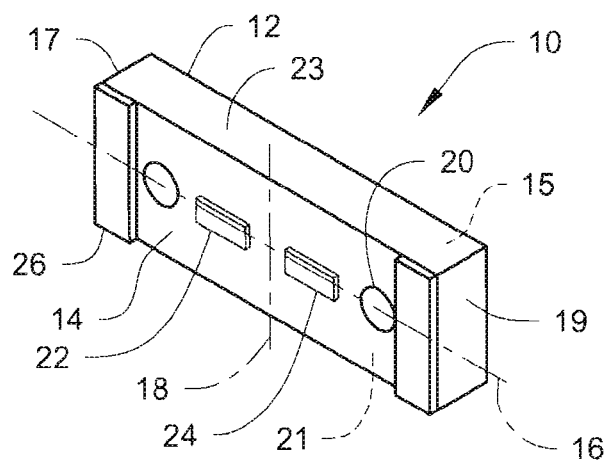
FIG. 1 illustrates a die circuit assembly with stand-offs and fiber optic die mounted on the die circuit assembly.

Referring to FIG. 1, one example of a die circuit assembly 10 contains a block 12, a plurality of alignment holes 20, at least one first fiber optic die 22, at least one second fiber optic die 24, and a plurality of stand-offs 26. As described further herein, the first die 22 will be described as a transmitter die that performs an optical transmission function, and the second die 24 will be described as a receiver die that performs an optical receive function. It is to be realized however, that the die 22, 24 are not limited to being transmitter and receiver die.

The block 12 has a first major surface 14, a second major surface 15 opposite the first major surface 14, a first end 17 opposite a second end 19, and a first side 21 opposite a second side 23. In the embodiment shown in FIG. 1, the block 12 has a first axis 16 that is longitudinal to the block 12 and extends from the first end 17 to the second end 19. The block 12 also has a second axis 18 that is perpendicular to the first axis 16.

Figure 4:
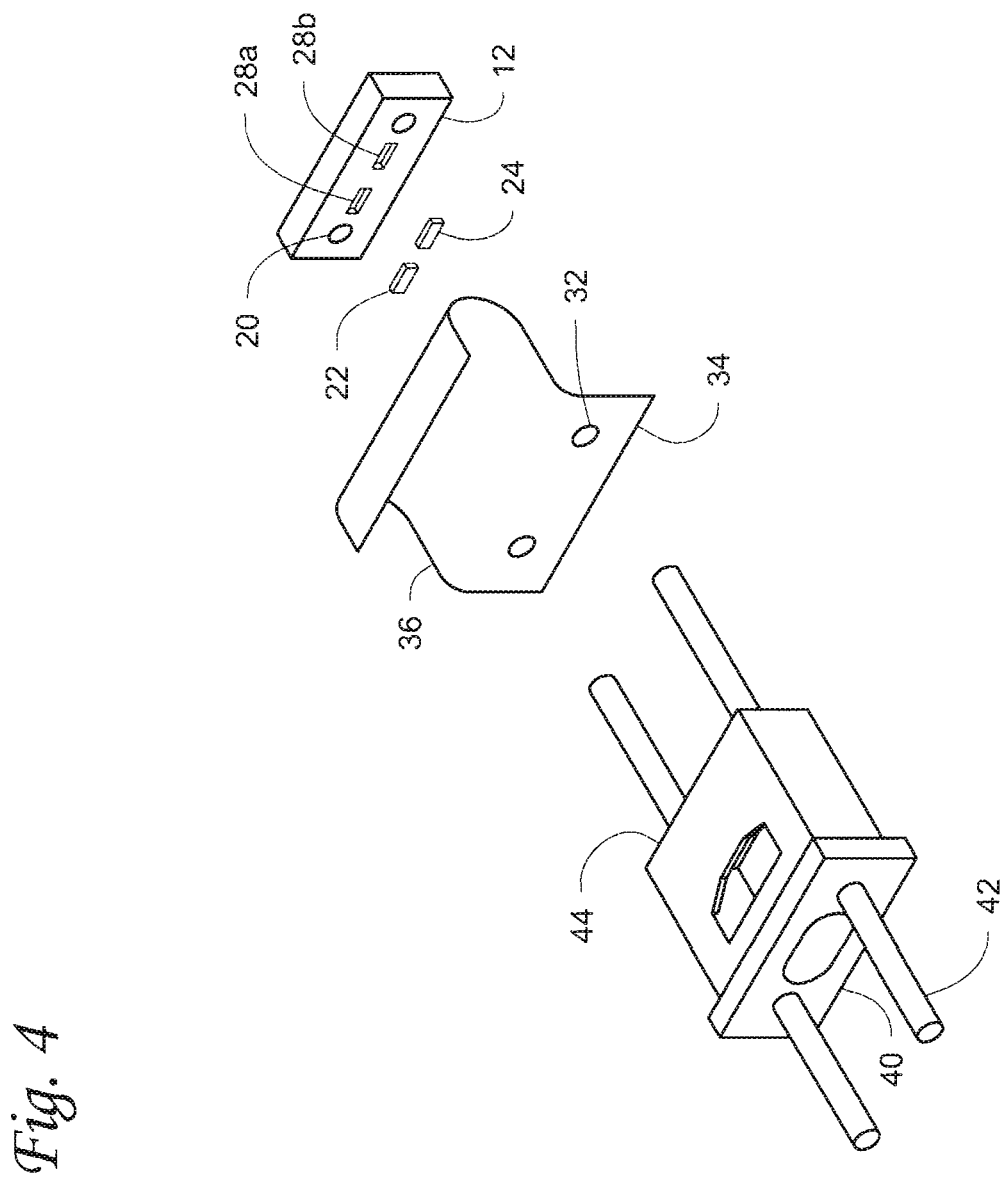
FIG. 4 illustrates an exploded view of various components of a flexible circuit assembly and an MT connector.

The block 12 can be made of, for example, a non-conductive material. The block 12 material can have a thermal coefficient of expansion that is close to the thermal coefficient of expansion of a fiber optic connector, preferably an MT connector 40, as shown in FIG. 4. The block 12 can be any size or shape that allows for attachment to a flexible circuit 36 but a preferred embodiment is that it be rectangular and dimensioned to be about equal to the first end 44 of the MT connector 40, as shown in FIG. 4. The fiber optic connector can be an off-the-shelf optical connector that is used to connect an optical transmission medium, for example optical fiber cable, to optical equipment, for example fiber optic die 22, 24. The fiber optic connector can be any type of connector including, but not limited to, MT, SC, ST, FC, LC, FDDI, etc.

The alignment holes 20 extend through the block 12 from the first major surface 14 to the second major surface 15 and are aligned along the first axis 16, as shown in FIG. 1. The alignment holes 20 are on opposite sides of the second axis 18. In one embodiment, the alignment holes 20 are made to align to the alignment pins 42 of off-the-shelf MT connectors 40, as shown in FIG. 4.

Figure 2:
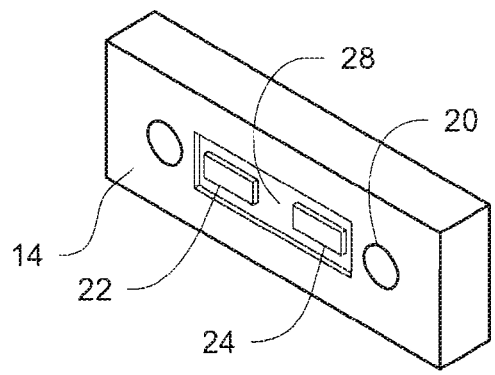
FIG. 2 illustrates a die circuit assembly without stand-offs and fiber optic die mounted within a recess in the die circuit assembly.
Figure 5B:
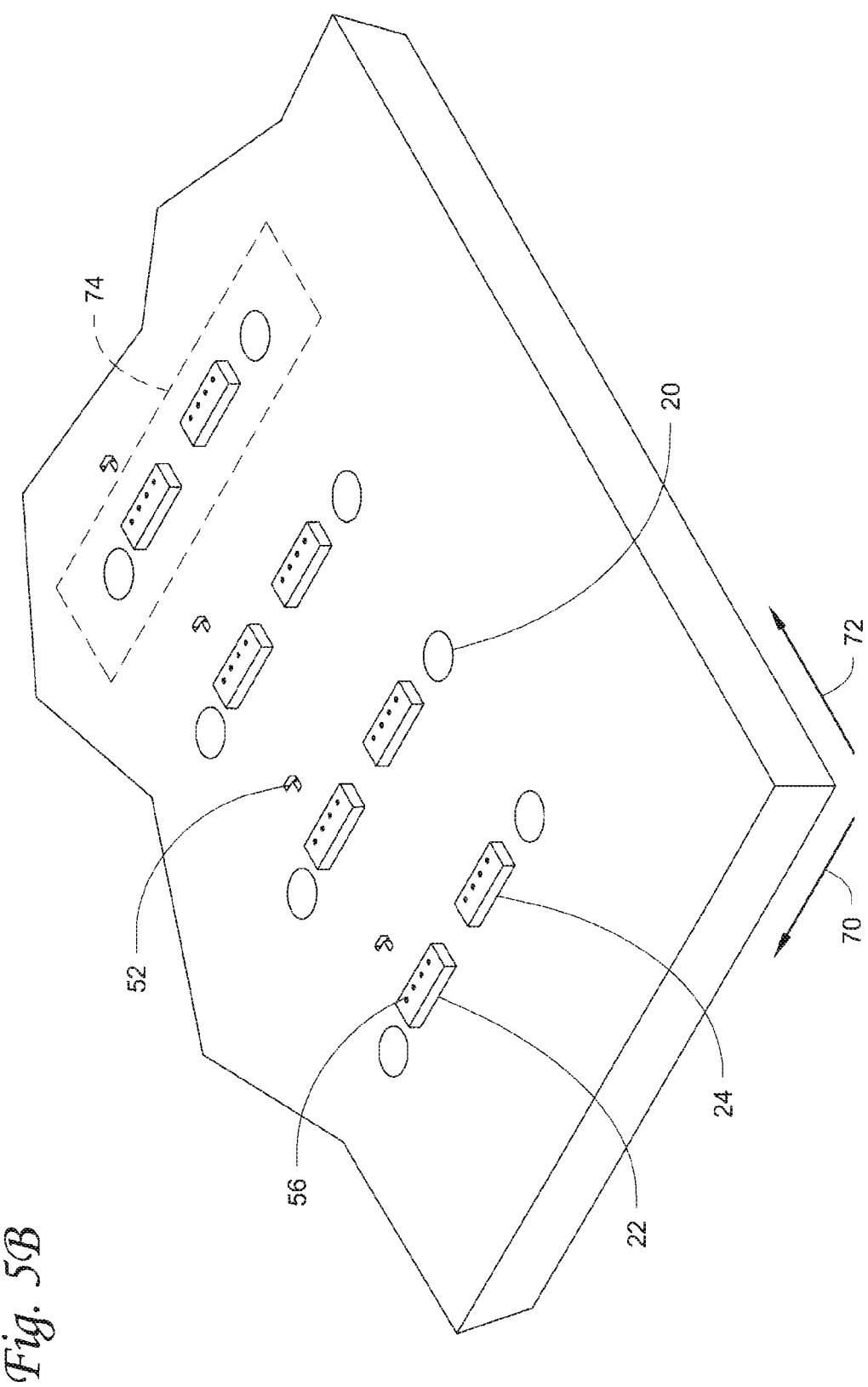
FIG. 5B illustrates an enlarged view of the portion within the circle 5B in FIG. 5A.

The transmitter die 22, for example a vertical cavity surface emitting laser (VCSEL) driver and the receiver die 24, for example a pin diode array (PDA) are disposed on the first major surface 14 of the block 12, are aligned along the first axis 16, and are disposed on opposite sides of the second axis 18, as shown in the embodiment of FIG. 1. In the embodiment shown in FIG. 2, the block 12 contains at least one recess 28 and the transmitter die 22 and the receiver die 24 are disposed in the recess. In the embodiment shown in FIG. 4, the block 12 contains a plurality of recesses 28a, 28b and at least one fiber optic die 22, 24 is disposed in each recess. In yet another embodiment, as illustrated in FIGS. 1, 5A and 5B, the block 12 does not contain a recess for the die 22, 24 and the die 22, 24 are disposed on the first major surface 14. The function of the fiber optic die 22, 24 is to receive and/or transmit optical signals.

The fiber optic die 22, 24 can be attached to the block 12 with, for example, adhesives, epoxy, or by thermal compression bonding. As shown in FIG. 1, the fiber optic die 22, 24 are mounted to be aligned on the first axis 16 between the alignment holes 20. The placement of the fiber optic die 22, 24 to the alignment holes 20 is with micron accuracy. The fiber optic die 22, 24 are mounted so that the distance between each fiber optic die 22, 24 and its adjacent alignment hole 20 has, for example, a geometric true position tolerance at the center axis in the order of 10 microns or less. The fiber optic die 22, 24 can be made of a semiconductor material, for example, silicon.

In one embodiment, the transmitter die 22 is mounted on the block 12. Thereafter, the receiver die 24 is mounted on the block 12 at a position relative to the location of the transmitter die 22. The alignment holes 20 are then formed in the block 12 relative to the position of the transmitter die 22 and/or the receiver die 24. In another embodiment, a first die 22, 24 is mounted on the block 12 and a second die 22, 24 is mounted on the block 12 at a position relative to the location of the first located die 22, 24. The alignment holes 20 are then formed in the block 12 relative to the position of one or both of the die 22, 24.

As illustrated in the embodiment of FIG. 1, a plurality of stand-offs 26 are disposed on the first major surface 14 of the block 12. The stand-offs 26 help maintain the planarity of the fiber optic die 22, 24 normal to the surface of the flexible circuit 36 and to the planarity of the fiber optic connector 40. In the embodiment shown, the stand-offs 26 are disposed on the first major surface 14 adjacent the first end 17 and second end 19 of the block 12 and the plurality of alignment holes 20 are disposed between the stand-offs 26. The stand-offs 26 are not limited to the position as shown in FIG. 1 and could be situated in any manner or configuration on the block 12 as long as the planarity of the fiber optic die 22, 24 is maintained and the alignment holes 20 and the fiber optic die 22, 24 are not compromised or covered. The stand-offs 26 can be mounted to the block 12 by, for example, adhesives or thermal compression bonding.

Stand-offs 26 are not required in all embodiments of the die circuit assembly 10. The embodiment of FIG. 2, for example, does not contain stand-offs 26. The planarity of the first major surface 14 maintains the planarity of the fiber optic die 22, 24 normal to the surface of the flexible circuit 36 and to the planarity of the fiber optic connector 40.

Figure 3:
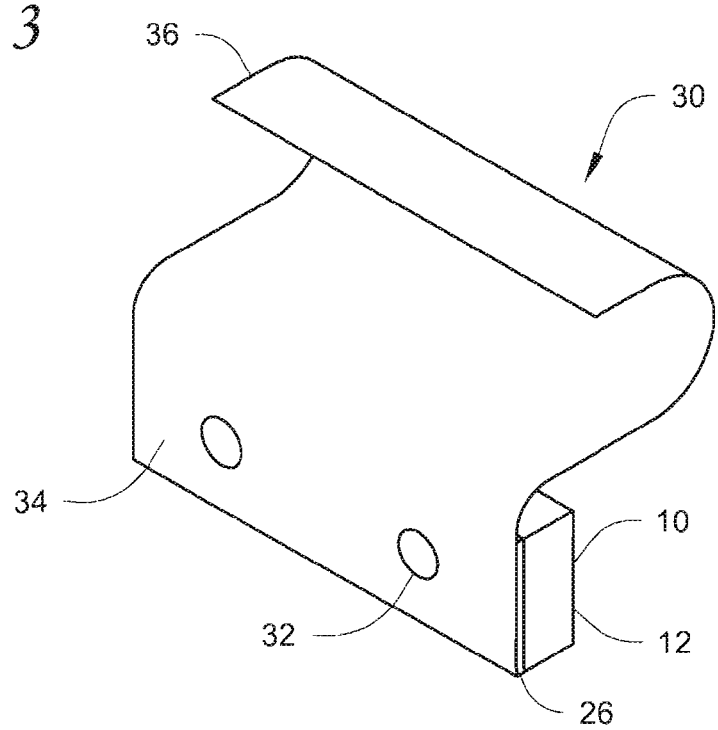
FIG. 3 illustrates a flexible circuit assembly containing the die circuit assembly of FIG. 1 integrated with a flexible circuit.

Referring to FIG. 3, an embodiment of a flexible circuit assembly 30 is shown that contains a flexible circuit 36 and the die circuit assembly 10 attached to a first end 34 of the flexible circuit 36. The fiber optic die 22, 24 are electrically connected to the flexible circuit 36 and the flexible circuit 36 directs electrical signals to and from the fiber optic die 22, 24. These electrical signals are directed to and from electronic components in a separate circuit card assembly.

As shown in the embodiment of FIGS. 3 and 4, the first end 34 of the flexible circuit 36 contains alignment holes 32 that are made to align to the alignment pins 42 of an off-the-shelf ferrule fiber optic connector 40 and to the alignment holes 20 of the block 12. Due to the accurate placement, at a micron level, of the fiber optic die 22, 24 to the alignment holes 20 of the block 12, it is possible to integrate the fiber optic die 22, 24, the flexible circuit 36 and the MT connector 40 via the alignment holes 20, 32 and alignment pins 42, to obtain an accurate alignment of the fiber optic die 22, 24 to the MT connector 40 thereby limiting alignment errors and improving performance.

The fiber optic die 22, 24 are disposed between the first major surface 14 of the block 12 and the first end 34 of the flexible circuit 36. In the embodiment as shown in FIG. 3, the stand-offs 26 are disposed on the first major surface 14 of the block 12 and are disposed between the first end 34 of the flexible circuit 36 and the block 12. In other embodiments, the stand-offs 26 are not included and the first major surface 14 of the block 12 is directly attached to the first end 34 of the flexible circuit 36. Due to the alignment of the alignment holes 20, 32 and the normality of the surface of the block 12 to the flexible circuit 36 surface and the MT connector 40, the fiber optic die 22, 24 are thus accurately aligned to the fiber optic connector 40.

Attachment of the block 12, with or without stand-offs 26, to the flexible circuit 36 could be by, but not limited to, thermal compression bonding, adhesives, or epoxy.

In one embodiment, the entire flexible circuit 36 is made of a light translucent material. In another embodiment, the first end 34 of the flexible circuit 36 is made of or contains a light translucent material. The light translucent material is such that it is effectively transparent to the wavelength of the optical light thereby allowing the fiber optic connector 40 to transmit the optical signal through the first end 34 to the fiber optic die 22, 24 and the fiber optic die 22, 24 to transmit the optical signal through the first end 34 to the fiber optic connector 40. The flexible circuit 36 could be made of, for example, a polyimide material.

The material is preferred to be of a similar thermal coefficient of expansion as the fiber optic connector 40.

FIGS. 5A and 5B illustrate an example of how to form a plurality of the die circuit assembly 10 from an assembly 50. The assembly 50 is a multiple die circuit assembly that includes fiducials 52 and a plurality of die sets 74. Each die set 74 includes a transmitter die 22 and a receiver die 24 on a substrate 54. In addition, alignment holes 20 are provided on the substrate 54. It is to be realized that the die 22, 24 are not limited to being transmitter and receiver die.

The substrate 54 has a top surface 58, a bottom surface 60, a first side edge 62, a second side edge 64 opposite the first side edge 62, a third side edge 66, a fourth side edge 68 opposite the third side edge 66, an x-axis 70 and a y-axis 72. The substrate 54 is generally rectangular and planar, but can have any curvature or shape. The substrate 54 is made of, for example, a non-conductive material.

The fiducials 52 are marks on the top surface 58 of the substrate 54. The fiducials 52 allow for the identification of position to facilitate the accurate placement of the transmitter die 22 and/or the receiver die 24 on the substrate. In the illustrated embodiment, a fiducial 52 is associated with each die set 74. However, other arrangements of fiducials 52, including a single fiducial 52 for all of the die sets, can be used.

The die 22, 24 of each die set 74 are disposed on the top surface 58 of the substrate 54 and can be attached to the substrate 54 with, for example, adhesives, epoxy, or by thermal compression bonding. For each die set 74, the transmitter die 22 is preferably positioned relative to its associated fiducial 52. The receiver die 24 can be positioned relative to the location of the transmitter die 22 and/or the associated fiducial 52 for that die set. The alignment holes 20 can be formed in the substrate 54 relative to the position of the transmitter die 22 and/or the receiver die 24 and/or the fiducial 52. The alignment holes 20 extend through the substrate 54 from the top surface 58 to the bottom surface 60. The die sets 74 can be mounted on the substrate 54 in any configuration. In the illustrated embodiment, the die sets 74 are arranged into columns along the y-axis 72 and rows along the x-axis 70.

Although FIGS. 5A and 5B illustrate the die sets 74 as disposed on the top surface 58 of the substrate, each of the die sets 74 could be disposed within one or more recesses as described above with respect to FIGS. 1 and 2.

The die 22, 24 each include a plurality of apertures 56, as shown in FIG. 5A, and the apertures 56 can be used as the reference point for positioning of the die 22, 24. It is to be realized however, that any part of the structure of the die 22, 24 can be used as the reference point for positioning and positioning is not limited to using the apertures 56 as the reference point. In the embodiment of FIG. 5B, each die 22, 24 contains four apertures 56. The apertures 56 comprise openings through which light can pass and enter or exit the die 22, 24.

Figure 6:
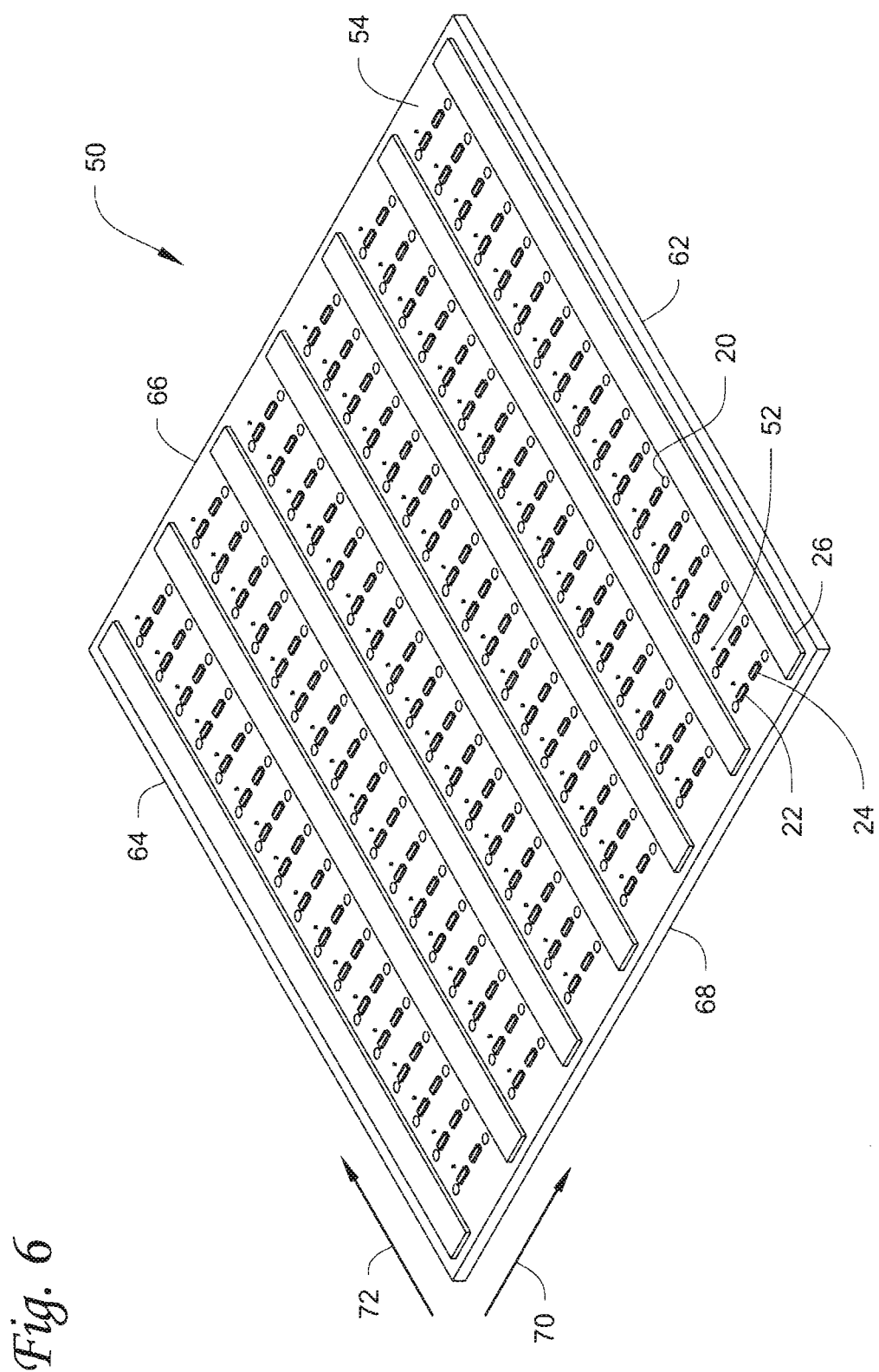
FIG. 6 illustrates a multiple die circuit assembly with stand-offs.

As shown in FIG. 6, stand-offs 26 are disposed on the top surface of the substrate 54. The stand-offs 26 perform the same function described above with respect to the stand-offs in FIG. 1.

In one example of forming the die circuit assembly 10, one takes the substrate 54 and marks the fiducials 52 on the surface 58. The die sets 74 are then placed on the substrate 54. To place each die set 74, the transmitter die 22 is first mounted to the substrate 54 at a predetermined position relative to the fiducial 52 corresponding to that die set 74. The receiver die 24 is then attached to the substrate 54 at a predetermined position relative to the same fiducial 52 or with respect to the transmitter die 22 or both. Aligning the die 22, 24 with respect to the corresponding fiducial 52 allow the die 22, 24 to be placed with micron accuracy. The fiber optic die 22, 24 are mounted so that the distance between each fiber optic die 22, 24 and its adjacent alignment hole 20 has, for example, a geometric true position tolerance at the center axis in the order of 10 microns or less.

Once the die 22, 24 are placed, the alignment holes 20 can be formed through the substrate 54. The alignment hole 20 adjacent the transmitter die 22 is formed through the substrate 54 at a location that is determined with respect to the location of the transmitter die 22, for example the aperture 56 of the die 22, or the corresponding fiducial 52 for that die set or both. The alignment hole 20 adjacent the receiver die 24 is formed through the substrate 54 at a location that is determined with respect to the location of the receiver die 24, for example the aperture 56 of the die 24, or the corresponding fiducial 52 or both. In another embodiment, the alignment holes 20 can be formed through the substrate 54 prior to the attachment of the die 22, 24 to the substrate 54. The first die 22 can be attached to the substrate 54 at a predetermined position relative to the fiducial 52 or with respect to the alignment hole 20 or both. The second die 24 can be attached to the substrate 54 at a predetermined position relative to the fiducial 52, with respect to the first die 22, with respect to the alignment hole 20 or any combination of the fiducial 52, first die 22, and alignment hole 20.

Once the die sets 74 are placed and the alignment holes 20 are formed, the assembly 50 is singulated to form individual die circuit assemblies 10. Singulation is the division of the assembly 50 into a plurality of the die circuit assemblies 10. As illustrated, the die sets 74 are disposed so that there is spacing between the die sets 74. Singulation is performed by cutting along the spacing or interstice between the die sets 74. For example, for the embodiment as shown in FIG. 5A, cutting is performed along the y-axis 72 between each column of die sets 74 and along the x-axis 70 for each row of die sets 74. Cutting may be done, for example, by saw or laser.

If used, the stand-offs 26 can be added to the individual resulting die circuit assemblies 10 or, as shown in FIG. 6, the stand-offs 26 can be added to the assembly 50 prior to singulation so that the resulting die circuit assemblies 10 after singulation have stand-offs 26.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A die circuit assembly comprising:
a block having a first major surface and a second major surface opposite the first major surface, the block further has a first axis longitudinal to the block and a second axis perpendicular to the first axis;
a plurality of alignment holes that extend through the block from the first major surface to the second major surface and are aligned along the first axis, the alignment holes are disposed on opposite sides of the second axis;
a fiber optic transmitter die and a fiber optic receiver die disposed directly on the first major surface and aligned along the first axis, the fiber optic transmitter die and the fiber optic receiver die being separated from each other and disposed on opposite sides of the second axis, each of the dies having a first surface attached to the first major surface of the block and an exposed surface opposite the first surface, the first surface directly faces the first major surface of the block, the exposed surface faces away from the first major surface and is positioned further away from the first major surface than the first surface; and a plurality of stand-offs disposed directly on the first major surface, the stand-offs not overlapping the dies.

2. The die circuit assembly of claim 1, wherein the block has first and second opposite ends, the stand-offs are disposed on the first major surface adjacent the first and second ends and the plurality of alignment holes are disposed between the stand-offs.

3. The die circuit assembly of claim 1, wherein the first major surface includes a recess, wherein at least one of the fiber optic transmitter die and the fiber optic receiver die is disposed in the recess.

4. The die circuit assembly of claim 3, wherein each of the fiber optic transmitter die and the fiber optic receiver die are disposed in the recess.

5. The die circuit assembly of claim 1, wherein the fiber optic transmitter die and the fiber optic receiver die each include a plurality of apertures, and the distance between a first aperture of the fiber optic transmitter die and an adjacent alignment hole is 10 microns or less, and the distance between a first aperture of the fiber optic receiver die and an adjacent alignment hole is 10 microns or less.

6. The die circuit assembly of claim 1, wherein the block is made of a non-conductive material.

7. The die circuit assembly of claim 1, wherein the dies are adjacent with each other and disposed between the alignment holes.

8. A flexible circuit assembly comprising:
a flexible circuit and a die circuit assembly attached to the flexible circuit,
wherein the flexible circuit includes first and second opposite ends, and includes alignment holes adjacent the first end;
wherein the die circuit assembly includes:
a block having a first major surface and a second major surface opposite the first major surface, the block further has a first axis and a second axis perpendicular to the first axis, and the first major surface faces the flexible circuit;
a plurality of alignment holes that extend through the block from the first major surface to the second major surface and are aligned along the first axis, the alignment holes are on opposite sides of the second axis, and the alignment holes of the block are aligned with the alignment holes of the flexible circuit;
a fiber optic transmitter die and a fiber optic receiver die directly disposed on the first major surface and aligned along the first axis, the fiber optic transmitter die and the fiber optic receiver die being separated from each other and disposed on opposite sides of the second axis, each of the dies having a first surface attached to the first major surface of the block and an exposed surface opposite the first surface, the first surface directly faces the first major surface of the block, the exposed surface faces away from the first major surface, and the exposed surface is positioned further away from the first major surface than the first surface.

9. The flexible circuit assembly of claim 8, further comprising a plurality of stand-offs disposed on the first major surface of the block, the stand-offs sandwiched by the flexible circuit and the block when assembled.

10. The flexible circuit assembly of claim 8, wherein the first major surface of the block includes a recess, wherein at least one of the fiber optic transmitter die and the fiber optic receiver die is disposed in the recess.

11. The flexible circuit assembly of claim 10, wherein each of the fiber optic transmitter die and the fiber optic receiver die are disposed in the recess.

12. The flexible circuit assembly of claim 8, wherein the block is made of a non-conductive material.

13. The flexible circuit assembly of claim 8, wherein the dies are adjacent with each other and disposed between the alignment holes.

14. The flexible circuit assembly of claim 8, wherein the exposed surface faces the flexible circuit.

15. A multiple die circuit assembly comprising:
a substrate having a plurality of fiducials marked on a top surface of the substrate;
a plurality of die sets on the top surface of the substrate, each of the die sets is associated with a respective one of the fiducials, wherein each of the die sets includes a fiber optic transmitter die and a fiber optic receiver die, each of the die sets has a first axis longitudinal to the respective diet set and a second axis generally perpendicular to the first axis, the corresponding fiber optic transmitter and receiver dies are aligned along the first axis and disposed on opposite sides of the second axis, each of the dies having a first surface attached to the top surface of the substrate and an exposed surface opposite the first surface, the first surface directly faces the top surface of the substrate, the exposed surface faces away from the top surface and is positioned further away from the top surface than the first surface; and
alignment holes associated with each of the die sets, the alignment holes extend through the substrate, the associated alignment holes are aligned along the first axis and disposed on opposite sides of the second axis and a plurality of stand-offs disposed on the top surface.

16. The multiple die circuit assembly of claim 15, wherein the fiducials, the die sets and the alignment holes are arranged in a plurality of rows and columns on the substrate.

17. The multiple die circuit assembly of claim 15, wherein the substrate is made of a non-conductive material.

18. The die circuit assembly of claim 15, wherein the dies are adjacent with each other and disposed between the respective alignment holes.

19. The multiple die circuit assembly of claim 15, wherein the fiducials are marks on the top surface of the substrate, the fiducials are disposed off the first and second axes, and each of the fiducials is aligned with one of the fiber optic dies along a direction generally parallel to the second axis.

20. A method comprising:
mounting a plurality of fiber optic die sets, each of the die sets including a fiber optic transmitter die and a fiber optic receiver die, on a top surface of a substrate having a plurality of fiducials on the top surface, at least one fiber optic die of each die set is positioned on the top surface relative to a corresponding one of the fiducials; and
forming first and second alignment holes through the substrate for each of the die sets,
wherein each of the die sets has a first axis longitudinal to the respective die set and a second axis generally perpendicular to the first axis, the corresponding fiber optic dies are aligned along the first axis and disposed on opposite sides of the second axis, and the corresponding ones of the first and second alignment holes are aligned along the first axis and disposed on opposite sides of the second axis, each of the dies having a first surface attached to the top surface of the substrate and an exposed surface opposite the first surface, the first surface directly faces the top surface of the substrate, the exposed surface faces away from the top surface and is positioned further away from the top surface than the first surface.

21. The method of claim 20, wherein each fiber optic die and the alignment holes of each die set are located in predetermined positions in relation to the fiducial corresponding to the die set, wherein the first and second alignment holes of each die set are formed prior to or after mounting of the fiber optic die.

22. The method of claim 20, wherein the die sets each include a plurality of die apertures, and the alignment holes of each die set are drilled in relation to the die apertures corresponding to the die set.

23. The method of claim 20, further comprising arranging stand-offs on the top surface of the substrate.

24. The method of claim 20, further comprising singulating the substrate to form a plurality of die circuit assemblies each including one of the die sets and corresponding ones of the first and second alignment holes.

25. The method of claim 24, comprising singulating the substrate such that the resulting die circuit assemblies do not include the fiducials.

\* \* \* \* \*